Feb. 7, 1961 L. HALTER 2,970,638
SEAT AND BACKREST CONSTRUCTION
Filed Jan. 6, 1958

INVENTOR:
L. Halter
ATTYS.

2,970,638
Patented Feb. 7, 1961

United States Patent Office

2,970,638

SEAT AND BACKREST CONSTRUCTION

Ludwig Halter, Hohenlohestrasse 38, Wildbad,
Black Forest, Germany

Filed Jan. 6, 1958, Ser. No. 707,248

Claims priority, application Germany Feb. 5, 1957

9 Claims. (Cl. 155—191)

The invention relates to a seat (e.g. a motor car seat) adapted to the shape of the body and consisting of a seat and back-rest.

Seats are known which are cup-shaped in cross section and which are adapted to the shape of the body. These seats are intended to permit more comfortable, longer sitting without causing tiredness in various parts of the body. This aim is, however, achieved only in part in the known seat, since, in the case of these seats, despite their apparent adaptation to the shape of the body, the person sitting on the seat is able to press his body too far into the cup-shaped element of the seat so that he is then, practically speaking, jammed in between the side portions of the seat. In this position, the body is not properly supported.

The object of the invention is to provide a seat which is comfortable to sit in and which is at the same time conducive to good health.

According to the invention, there is provided a seat (e.g. a motor car seat) adapted to the shape of the body and consisting of a seat portion and a back-rest, the seat being provided with two firm support surfaces arranged at an angle of 90° or less to each other, each of said surfaces extending over a minor proportion of the width of the seat, one of the said support surfaces being positioned in the seat portion so that it is adapted to support the ischium tubers, whereas the other is provided in the back-rest and is adapted to support the os sacrum, to whose shape it conforms.

In this manner, the most favourable sitting position (degree of inclination of the pelvis), and simultaneously also the physiological curvature of the vertebral column are assured in the sitting position. The sitting position imposed by the seat is so selected that optimum digestion and respiration are assured, the best possible circulation of the blood during sitting is possible, whilst the muscles of the abdomen, pelvis and back are relieved to a considerable extent but remain ready for service.

The invention determines a specific angle between the os sacrum and the ischium. One of the two rigid supporting surfaces, i.e. the one positioned in the back-rest, supports the os sacrum and is adapted to the shape thereof, a recess preferably being provided for the ilium joints, whereas the other supporting surface, positioned in the seat, firmly supports the two ischium tubers.

According to a preferred feature of the invention the remaining surfaces of the seat, outside the two rigid supporting surfaces, are not upholstered or are only slightly upholstered, for example with the aid of a thin layer of foamed material or horsehair or the like. In this manner, it is ensured that the advantages obtained by the rigid supporting surfaces according to the invention are made use of to the full extent.

In order furthermore to ensure that the seated person will of necessity always sit with the ischium tubers on the rigid supporting surface, two troughs are preferably provided for the accommodation of the thighs in the seat. The angular position, width and length of these troughs is to be determined accordingly.

Whereas, furthermore, in the preferred form of the seat according to the invention, the portion of the seat surrounding the supporting surface for the ischium tubers is recessed and sufficiently large to relieve the muscles of the fundament, the depth of the troughs in the surface of the seat for the thighs is sufficient in comparison with the width of the said troughs to cause the thighs to bear on the seat predominantly with the tentinous portions thereof. In this manner, no pressure is exerted on either the muscles of the fundament or on the flexor muscles of the thigh. In the same manner, the vessels and nerves are also relieved.

The back-rest is preferably constructed in the manner of a trough on both sides of the supporting surface provided for the os sacrum. A space is provided on both sides in this cavity for the region of the kidneys, so that the said region of the kidneys is also not exposed to any kind of pressure.

The central plane of the back-rest associated with the vertebral column preferably projects relatively to the remaining surfaces of the back-rest and is furthermore adapted to the S-shape of the vertebral column. These projecting portions of the back-rest safeguard the optimum position of the vertebral column and they do so directly and not indirectly, as is generally the case in armchairs of known construction.

It is advantageous if the back-rest is trough-shaped on both sides of the projecting bearing surfaces adapted to the S-shape of the vertebral column, for the reception of the muscles extending on both sides along the vertebral column. These trough-like recesses of the back-rest, which receive the muscles extending on both sides of the vertebral column, thus permit the said muscles to function without being subjected to pressure, during sitting.

In the region of the thorax, the back-rest is slightly curved in the forward direction on both sides of the central plane. Connected to these sections, on the outside thereof, are laterally protruding marginal portions, care being given to providing regular transition from one portion to the other in correspondence with the shape of the body.

In this manner, the thorax is supported both from below and from the side and bears against the back-rest. Whereas the slightly projecting central plane of the back-rest ensures the S-shaped curvature of the vertebral column, the laterally projecting marginal portions prevent the vertebral column from slipping sideways and assist the diaphragmatic respiration and also the respiration of the thorax. In consequence of the supporting of the thorax, full freedom of movement of the midriff and thus also the most expedient size of the abdominal cavity during sitting are retained.

The invention is illustrated, merely by way of example, in the accompanying drawings in which.

Figure 1:
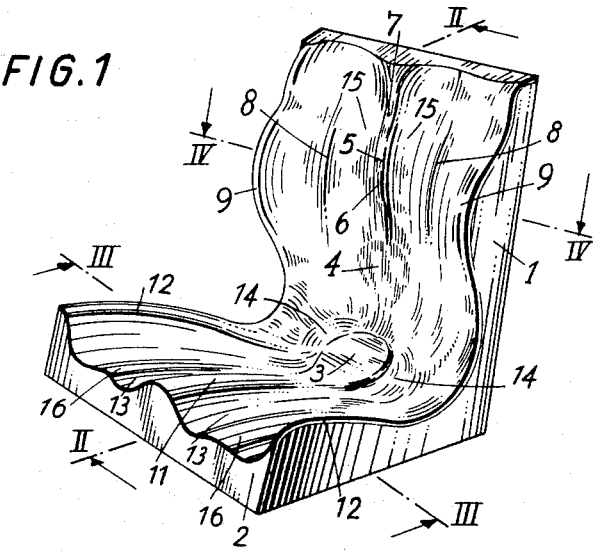
Figure 1 is a perspective view of a seat according to the invention.
Figure 2:
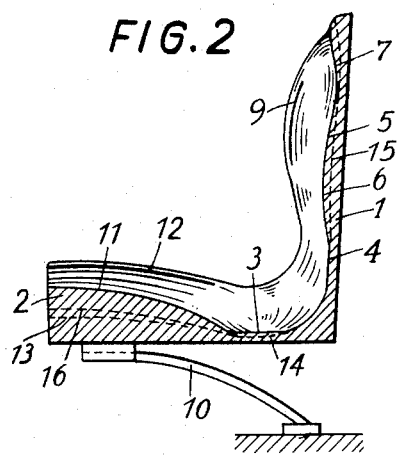
Figure 2 is a section along the central plane corresponding to the section line II—II of Figure 1.
Figure 3:
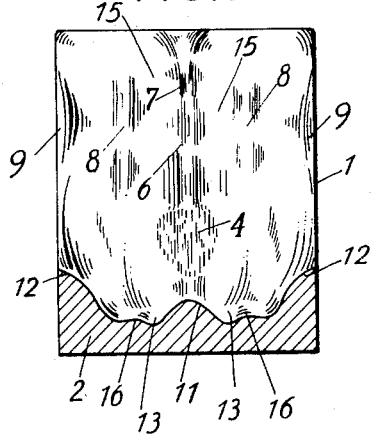
Figure 3 is a section through the seat in accordance with the section line III—III of Figure 1.
Figure 4:
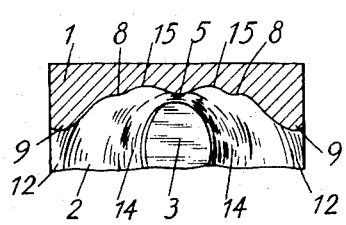
Figure 4 is a section through the back-rest of the seat in accordance with the section line IV—IV of Figure 1.

The seat according to the invention is cup-shaped, the back-rest 1 and the seat portion 2 being in one piece. There may be slight upholstering of the seat, for example by means of a thin layer of foamed material or the like, which may be provided outside the support surfaces. However, this upholstering is not shown in the drawings. If required, the support surfaces may also be given a covering which must however, in accordance with the underlying idea of the invention, be of an appropriate firm nature, and must in particular be stiffer than the remaining surfaces.

At the rearward end of seat portion 2, in the zone occupied by the ischium tubers of a user of the seat, is the lower support surface 3 which extends substantially horizontally. This surface is of elongated-oval shape, as clearly shown in Figure 1. On both sides of the surface 3, are troughs 14 for the muscles of the fundament.

Arranged at right angles or almost at right angles to the surface 3 and within the region occupied by the os sacrum of a user of the chair is a further firm support surface 4. This support surface is slightly smaller than the support surface 3 and is adapted to the shape of the os sacrum. At the upper end of the support surface 4 begins a projecting bead 5 which is adapted to the S-shaped curvature of the vertebral column. In the region of the lumbar forward curve, i.e. at 6, the said bead is forwardly curved, whereas it is rearwardly curved in the region of the thoracic kyphose at 7. The projecting vertebral column bead 5 and also the longitudinal troughs 15 prevent the exertion of pressure on the muscles extending along the vertebral column.

In the region of the thorax, at both sides of the central plane, i.e. at the reference numeral 8 in the drawing, the back-rest slopes forwardly and supports the thorax laterally and from below in the region of the true ribs (tilting-turning of surfaces). Joined to this section on both sides is a projecting marginal portion 9 which also serves for supporting the thorax. It is a further function of this marginal portion to assist the firm positioning of the vertebral column at a relatively high point, i.e. at a considerable distance from the pivoting point, so that the pressure exerted remains comparatively slight.

From the forward edge of the support surface 3 for the ischium extends a ridge 11 which increases in height in the forward direction in such manner that troughs 13 for the thighs are formed between the said ridge 11 and the edges 12.

The flat beads 16 in the troughs 13 prevent jamming of the thighs at the bottom of the troughs, when the thighs are in a tilted position.

The construction of the seat portion is of significance in that the shape imparted thereto causes the seated person to adopt the correct position relatively to the support surfaces 3 and 4. The angle of the bend of the hip is simultaneously determined thereby.

It should also be especially emphasized that the seat shown in the drawings permits the abdominal cavity to retain its maximum size. Thus, in addition to good respiration, good digestion and circulation, especially for the venous reflux (thoracic hypotonia) are preserved. This concerns, above all, the reflux from the legs. Free, unhindered blood circulation in the pelvic organs is assured.

Since the upholstery of the seat according to the invention is preferably comparatively slight, the necessary springing of the seat will advantageously be arranged mainly underneath the seat, so that the seat is elastically movable as a unit. For example, the cup element forming the seat according to the invention can also be placed on the conventional armchair spring system. The seat "cup" can also be positioned as a unit on a curved resilient bar 10.

The seat should be adapted in respect of its dimensions to the person for whom it is in each case intended. This can for example be done by corresponding construction of the seat and back-rest in various sizes corresponding to varying sizes of individual persons.

It will be advantageous to construct the seat as a pressing or moulding and, for this purpose, to use in particular sheet-metal or synthetic plastic material, although the use of other materials is not excluded.

The seat according to the invention is above all intended for use in cases wherein special harm to health is to be feared or expected in consequence of long periods of sitting. This is the case for example when driving a motor vehicle, so that the invention preferably proposes constructing the seat as a motor-car seat. It will of course be clear that the seat can also be used as an ordinary armchair.

Having thus described the invention what is claimed as new and desired to be secured by Letters Patent is:

1. A seat device adapted to the shape of the body comprising a seat portion and a back rest, said seat portion being shaped generally to the form of the seat and thighs of a person sitting in normal relaxed position, and the back rest being shaped generally to the form of the back of a person sitting in normal relaxed position, said seat portion being provided at its central portion near the rear of said seat portion with a slightly protruding area forming a firm support for the ischium tubers only of the seated person, and the back rest being provided with a slightly protruding area located centrally of said back rest to form a firm support for the os sacrum only of the seated person, whereby the major support of the seated person is by means of the ischium tubers and os sacrum, the distance of protrusion of said protruding areas being sufficient to assure that the muscular portions of the seat, thighs and back of the seated person bear less heavily on the remaining areas of the seat portion and of the back rest.

2. A seat device according to claim 1 in which the remaining areas of the seat beyond the two firm support surfaces are slightly upholstered, for example by means of a thin covering of horsehair, foamed material or the like.

3. A seat device according to claim 1 in which two troughs having sloping sides are arranged in the seat portion to receive the thighs, the depth of the said troughs in comparison with their width being sufficient to cause the thighs to bear on the seat portion substantially laterally only and predominantly in the tendinous portions of the thighs.

4. A seat device according to claim 3 in which a flat ridge is provided at the bottom of each trough.

5. A seat device according to claim 1 in which the central plane of the back-rest is shaped to support the vertebral column and projects relatively to the remaining surface of the back-rest and is adapted to the S-shape of the vertebral column.

6. A seat device according to claim 5 comprising a slight forward curvature of the back-rest on both sides of and spaced from said central plane in the region of the thorax.

7. A seat device according to claim 6, comprising projecting lateral marginal portions of the back-rest in the region of the thorax.

8. A seat device according to claim 5 in which the remaining surfaces of the back-rest to each side of said central plane are shaped to fit the back muscles and is set back with respect to said central plane to prevent excessive pressure against the muscles of the back.

9. In a seat device formed to fit a specific individual including a seat portion and a back portion, said seat portion including a substantially flat generally horizontal portion of a size, and in such a position as to form a support for the ischium tubers to form the principal support for the individual, the remainder of the seat portion being shaped to conform to the buttocks and thighs of the individual and positioned with respect to said generally flat horizontal portion to bear against the said buttocks and thighs to form a secondary support for said individual; and said back portion including a generally vertical relatively flat portion of a shape to fit and positioned to positively bear against the os sacrum of the individual to provide the principal support for the back of said individual, a further narrow area extending upwardly from said relatively flat portion and shaped to the natural curvature of the spine of said individual to normally bear against and support the spine of said individual, the remainder of said back portion being shaped to conform to the remainder of the back of said individual and positioned with respect to said relatively flat portion to form a secondary support for said back of said individual.

References Cited in the file of this patent

UNITED STATES PATENTS

| | | |
|---|---|---|
| D. 142,800 | Watson | Nov. 6, 1945 |
| 39,663 | Mansfield | Aug. 25, 1863 |
| 1,011,026 | Carpenter | Dec. 5, 1911 |
| 1,212,453 | Callaghan | Jan. 16, 1917 |
| 1,716,871 | Weldon | June 11, 1929 |
| 1,917,264 | Kellogg | July 11, 1933 |
| 2,131,963 | Mendell | Oct. 4, 1938 |
| 2,263,209 | Gildison | Nov. 18, 1941 |
| 2,659,418 | Berman | Nov. 17, 1953 |
| 2,769,185 | Biederman | Nov. 6, 1956 |
| 2,819,712 | Morrison | Jan. 14, 1958 |
| 2,847,061 | Morton | Aug. 12, 1958 |

FOREIGN PATENTS

| | | |
|---|---|---|
| 738,594 | France | Oct. 17, 1932 |